Jan. 27, 1959     S. GRAY     2,871,371
WIDE-BAND INTERFERENCE LIGHT FILTER
Filed May 6, 1954     2 Sheets—Sheet 1
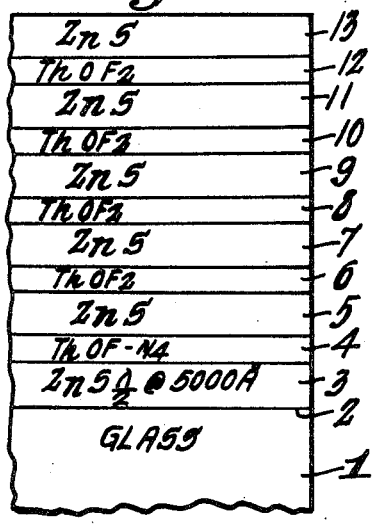
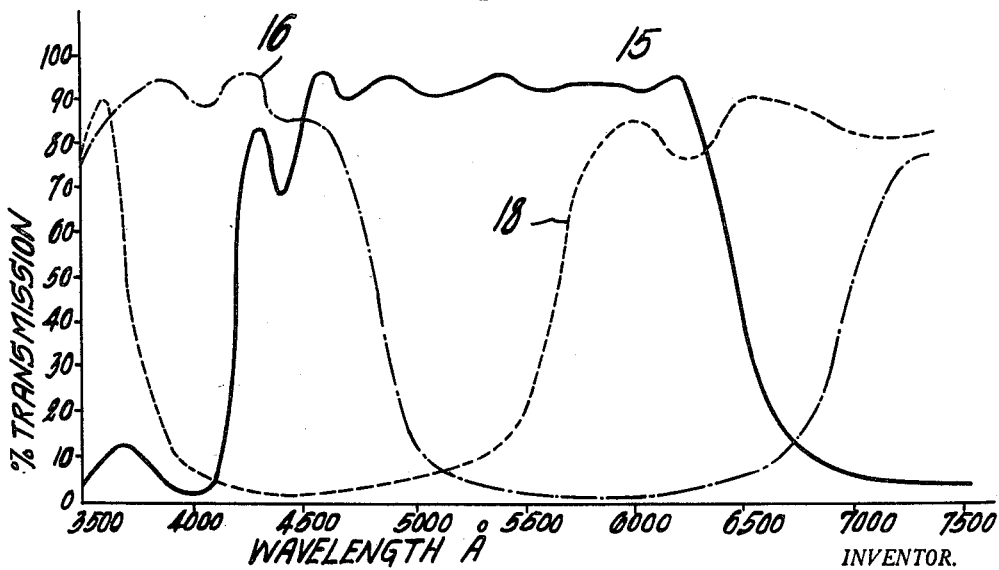
INVENTOR.
Sidney Gray
BY
ATTORNEY Jan. 27, 1959  S. GRAY  2,871,371
WIDE-BAND INTERFERENCE LIGHT FILTER
Filed May 6, 1954  2 Sheets-Sheet 2

INVENTOR.
Sidney Gray
BY
ATTORNEY

United States Patent Office 2,871,371
Patented Jan. 27, 1959

2,871,371
WIDE-BAND INTERFERENCE LIGHT FILTER

Sidney Gray, Somerville, N. J., assignor to Radio Corporation of America, a corporation of Delaware Application May 6, 1954, Serial No. 428,025

6 Claims. (Cl. 250—226)

This invention relates to improved optical devices and, more particularly, to an improved light filter of the interference type capable of transmitting light of a relatively broad and sharply defined range of wavelengths.

Interference filters composed of superimposed strata of dielectric materials are commonly known as dichroic filters. Generally such filters are characterized by a relatively high degree of efficiency, that is to say, substantially all the visible light impinging on the surface of the filter is either reflected or transmitted, only negligible quantities of light being lost by absorption. Previous dichroic filters have been described that selectively transmit, or reflect light of a relatively narrow range of wavelengths in the visible spectrum. Depending on their use these filters are often referred to as band-pass and band-stop filters, respectively. A general mathematical discussion of the design of dichroic filters may be found in an article by L. Ivan Epstein, entitled, The Design of Optical Filters, page 806, Journal of The Optical Society of America, November 1952.

In color television cameras and in other optical devices it is often difficult to provide a filter system capable of dividing the spectrum into predetermined color groupings and of limiting the overall response of the device to the visible spectrum. In a three-color television camera for example at least three major filters are commonly utilized. One filter is selected to transmit light in a limited range of frequencies at about the middle of the visible spectrum. A second filter is utilized to transmit only light at the high frequency end of the visible spectrum, and a third filter to transmit light only at the low frequency end of the visible spectrum. Presently known filters, however, for red light do not provide desirable cut-off characteristics at both ends of their transmission bands. For example, a typical system may utilize a middle spectrum pass-band filter that transmits primarily green light. A low frequency pass-band filter having a desirable high frequency cutoff characteristic not only transmits red light but also transmits undesirably large quantities of light in the invisible infrared region. A corresponding situation also exists with respect to blue filters of the dichroic type.

In those systems utilizing only dichroic filters a further problem is present in that dichroic filters designed primarily to transmit red light also transmit substantial proportions of ultraviolet as well as red and infrared light. Correspondingly, blue-pass dichroic filters transmit infrared as well as blue and ultraviolet light.

Most known photosensitive materials that are suitable for use in television cameras are relatively sensitive to light in both the ultraviolet and infrared regions of the spectrum. Previous television color cameras, therefore, either provide excessive blue and red signals or fail to provide an optimum three-way color division of the visible spectrum.

One object of the instant invention is to provide an improved dichroic light filter.

Another object is to provide an improved interference type light filter capable of transmitting a relatively high and uniform proportion of light in the entire visible spectrum, and of rejecting from transmission light in the frequency ranges immediately adjacent to the visible spectrum.

Another object is to provide an improved optical filter device especially adapted for use with color television cameras and other color reproduction systems.

Another object is to provide an improved interference light filter having transmission cutoff characteristics closely approximating the optimum characteristics for color reproduction systems.

A further object is to provide an improved broad pass-band light filter device especially adapted for use in combination with color filters to form an improved color filter system having minimum distortion effects due to the transmission of light of frequencies at the ends of the visible spectrum.

Yet another object is to provide an improved photo-sensitive cathode ray tube and improved targets for such tubes.

These and other objects are accomplished by the instant invention which provides an interference filter comprising alternate strata of zinc sulfide and thorium-oxy-fluoride. The zinc sulfide strata are each about one-half wavelength thick and the thorium-oxy-fluoride strata are each about one-quarter wavelength thick, both with respect to the wavelength of light at about the middle frequency of the visible spectrum. The filter comprises a total of at least 5 strata and preferably includes 11 or more.

The invention will be described in greater detail with reference to the drawing of which:

Figure 1a is a schematic, fragmentary, cross-sectional, elevational view of a filter according to the invention.

Figure 1b is a table illustrating the process steps for making the filter illustrated in Figure 1a.

Figure 2 is a curve describing the light transmitting characteristics of the filter illustrated in Figures 1a and 1b.

Figure 3:
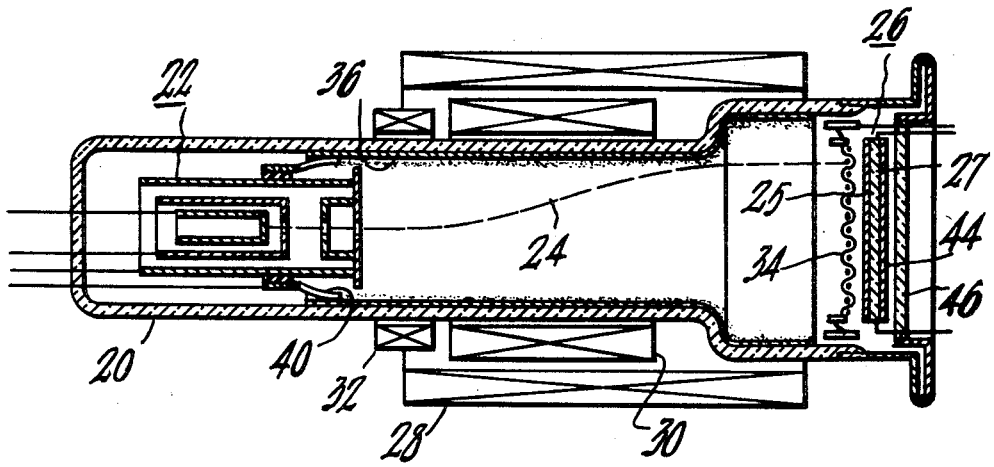
Figure 3 is a schematic, cross-sectional, elevational view of a television pick-up tube according to the invention.
Figure 4:
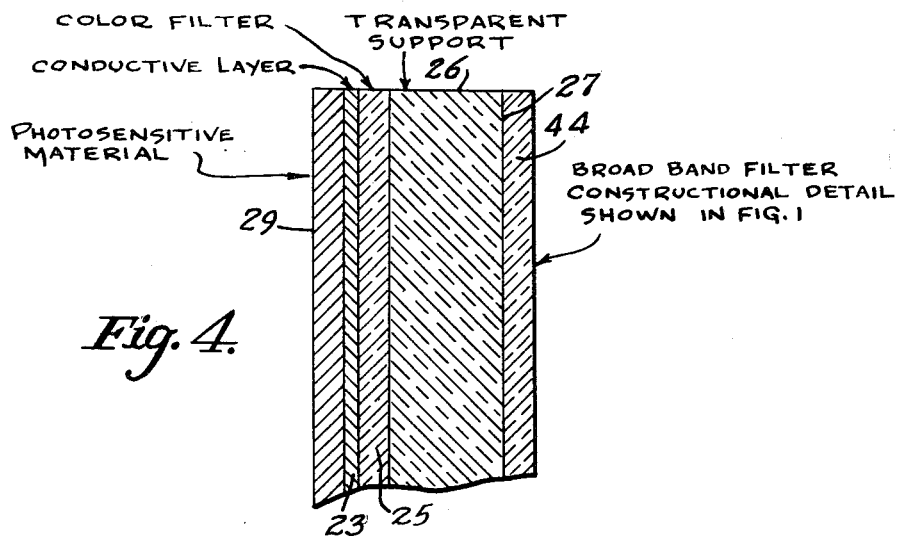
Figure 4 is a greatly enlarged, schematic, cross-sectional, elevational view of the target structure of the pick-up tube shown in Figure 3.

The filter shown in Figure 1a transmits 90% or more of the light striking it normal to its surface and having a wavelength between about 4500 Angstroms and 6300 Angstroms. Light of shorter wavelength than about 4200 Angstroms and of longer wavelength than about 6600 Angstroms is substantially excluded from transmission. The filter includes an optical base 1, which may be of glass or other transparent material, and which may be assumed for purposes of illustration to have an index of refraction of 1.52.

A surface 2 of the base bears a transparent film composed of 11 successively superimposed layers designated respectively by the reference numerals 3 through 13. The odd numbered layers are of zinc sulfide and have each an effective optical thickness of 2500 Angstroms, or one-half the wavelength of blue-green light. The even numbered layers, which are disposed between successive pairs of the odd numbered layers are of thorium-oxy-fluoride and have each an effective optical thickness of about 1250 Angstroms, or about one-quarter wavelength of light at the middle of the visible spectrum.

The successive strata, or layers of the film may be applied and their thicknesses controlled in the manner described by G. L. Dimmick in U. S. Patent No. 2,338,-234, December 10, 1946. In the production of the filter shown in Figure 1, generally according to the method of said patent, a control light beam at an angle of 20° from the normal to the surface 2 and a filter having a narrow band transmission maximum at 4730 Angstroms are employed.

The successive layers are controlled according to the values of reflection shown in Figure 1b from which it will be seen that zinc sulfide is evaporated upon the surface 2 until the light reflection reaches 320% of the light reflection of the untreated surface, at which point the optical thickness of the zinc sulfide is effectively one-quarter the wavelength of light of the critical frequency (5000 Angstrom light). Evaporation of zinc sulfide is continued until the reflection reaches a minimum of 100% at which point the layer is effectively one-half wavelength thick. Thorium-oxy-fluoride is then evaporated over the zinc sulfide layer until the light reflection reaches a minimum of 79% indicating that a stratum of thorium-oxy-fluoride is formed about one-quarter wavelength thick. Zinc sulfide is then again evaporated according to the table of Figure 1b and successive evaporations are carried out to deposit a total of 6 layers of zinc sulfide, each one-half of one wavelength in effective optical thickness, each two of these layers being separated by a layer of thorium-oxy-fluoride each one-quarter wavelength in effective optical thickness.

In a typical practical apparatus for evaporating interference films according to the method described one surface (not shown) of the glass base 1 is coated with a quarter-wave thick film of magnesium fluoride to minimize its light reflection. The base is supported in a vacuum chamber such as a bell jar and the $MgF_2$-coated surface is covered with a protective glass sheet, the opposite surface 2 of the base being exposed toward the evaporator to receive evaporated deposits. A light beam is directed upon the base at an angle of about 20° from the normal. The light reflected from the base is passed through a filter having a narrow maximum transmission band at 4730° Angstroms and is measured by a photocell. The light beam approaches the base through the protective cover glass and, therefore, many surfaces besides the exposed surface reflect portions of the light.

The reflection figures given in the drawing are the actual experimental values as determined under such practical conditions and do not represent merely theoretical values of reflection from the interference film alone. The actual values of reflection may differ slightly according to the apparatus used, being affected principally by differences in the quantities of evaporated material deposited during the process on the bell jar and other optical surfaces of the system. The maxima and minima of the reflection, however, may be readily determined regardless of their specific values.

A light transmission curve 15 for light normal to the surface of a filter according to the invention is shown in Figure 2. It will be seen from an inspection of the curve that at least 90% transmission is achieved throughout almost the entire visible spectrum and that light beyond the visible spectrum is sharply attenuated. Further, the cutoff characteristics at both ends of the transmission curve closely approximate the optimum cutoff characteristics for color reproduction purposes. The filter, therefore, may be utilized as an overall filter to limit the response of an optical device to light within the visible spectrum. It is especially suitable for use in color reproduction systems in combination with color filters to minimize color distortion effects due to ultraviolet and infrared light.

The effect of a filter acording to the invention in improving the overall transmission characteristics of a typical three-color system is illustrated by the series of curves 15, 16, 17, 18 of Figure 2. Curves 16 and 18 represent, respectively, the light transmission characteristics of typical blue and red dichroic filters as used in a vidicon type color television camera. The pass-bands of both the blue and the red filters extend into the ultraviolet and the infrared portions of the spectrum. When these filters are used alone in a color television camera system the "blue" portion of the television camera is excited not only by blue light but also by ultraviolet and infrared light to produce a "blue" signal. Similarly, infrared and ultraviolet light impinging on the camera is added to the normal red light to provide a "red" signal. Thus, the signal output of the television camera is distorted to over-emphasize the blue and the red signals. When a filter according to the invention having a pass-band illustrated by the curve 15 is inserted in the system in combination with the blue and the red filters the ultraviolet and the infrared transmissions of the system are sharply attenuated so that the color fidelity of the camera is improved and the color distortion effects are minimized.

The overall transmission characteristic of the resulting filter system is modified by the filter according to the invention to closely approximate the optimum characteristic for color reproduction systems. The high frequency cutoff portion of the characteristic falls from more than 85% transmission at 4300 Angstroms to less than 10% transmission at 4100 Angstroms. The low frequency cutoff portion falls from more than 85% transmission at 6300 Angstroms to less than 10% transmission at 6800 Angstroms. The transmission characteristic is substantially flat and uniform throughout the frequency range between 4300 and 6300 Angstroms. Even greater differences may be obtained between the high and low transmission ratios by increasing the number of layers, or strata in the filter.

Interference filters according to the invention are particularly suitable for use in color television pickup tubes such as the tube shown in Figure 3 and described and claimed in the copending application of Paul K. Weimer, Serial No. 344,497, filed March 25, 1953 and assigned to the same assignee as the instant application. As shown in the drawing the tube comprises a vacuum tight envelope 20 with an electron gun 22 mounted at one end thereof. The electrodes of the electron gun include the usual cathode, control electrode and one or more accelerating anodes which are connected to lead-in pins. An electron beam indicated by the dotted line 24 is directed from the gun upon a target 26 at the other end portion of the tube. Means are provided for focussing the electron beam and for scanning the beam over the target to form a raster. Such means may include a focussing coil 28 and a deflection yoke 30 as well as an alignment coil 32. An electron permeable electrode 34 is positioned adjacent to the target, and in operation functions together with the focussing coil to insure that the beam in its final approach to the surface of the target is normal thereto. A conductive coating 36 on the interior of the envelope is utilized as a final accelerating electrode. Spring tension fingers 40 mounted on the gun but insulated therefrom provide an electrical connection from the coating to one of the lead-in pins.

As explained in detail in the co-pending application referred to, a color filter and a photosensitive lamina are disposed on the side 25 of the target 26 facing the electron gun. The color filter comprises interlaced strips of alternating red-, green- and blue-transmitting interference filters, each of which restricts the light which is transmitted to an individual elemental area of the photosensitive lamina. A broad band interference filter 44 according to the invention may be advantageously disposed upon the opposite surface 27 of the target to cover substantially the same area of the target as the photosensitive lamina. Thus the broad band filter limits the light transmission through all of the elemental area color filters and modifies the light transmission characteristics of the blue and the red filters thereby to improve the color response of the pickup tube.

In a pickup tube such as that heretofore described, a filter according to the invention may be disposed upon any transparent surface situated between the photosensitive target and the object of vision. It need not be included within the tube. It may be disposed upon either the inside or the outside of the face plate 46, for example, or upon a separate supporting member within or without the tube.

It has been found that the ratio between the refractive indices of the materials in the different strata of a color filter according to the invention is relatively critical. Zinc sulfide has a refractive index of about 2.3, and thorium-oxy-fluoride has an index of about 1.47. A filter according to the invention includes half wavelength thick strata of zinc sulfide interleaved with quarter wavelength thick strata of any transparent material having an index of refraction of about 1.46 to 1.49. The use of thorium-oxy-fluoride as the low index material in a filter according to the invention is not essential, however, but any other known substances having a similar refractive index may be substituted therefor, for example, thorium fluoride (1.49) or silica (1.48). Any substantial variation from this refractive index, however, affects the transmission characteristics of the filter. If a material having a smaller refractive index is utilized such as, for example, cryolite which has an index of 1.3 or less, the transmission frequency band is narrowed so that the filter transmits a relatively narrow band. On the other hand, if a higher index material is substituted for the thorium-oxy-fluoride, the transmission band of the filter is extended and includes substantial proportions of light beyond the visible spectrum.

The optical element utilized as a base upon which the film is deposited need not be of glass but may be of any desired light transparent material.

There has thus been described an improved interference filter that transmits light of substantially all wavelengths in the visible spectrum and reflects light in the invisible regions of the spectrum.

What is claimed is:

1. An interference light filter comprising alternate strata of zinc sulfide and thorium-oxy-fluoride, said strata of zinc sulfide each being about 2500 Angstroms thick and said strata of thorium-oxy-fluoride each being about 1250 Angstroms thick, said filter being transparent to light of all wavelengths throughout a wide band of wavelengths in the normal visible spectrum, and having a short wavelength cutoff characteristic of at least 85% transmission at 4300 Angstroms and less than 10% transmission at 4100 Angstroms and having a long wavelength cutoff characteristic of at least 85% transmission at 6300 Angstroms and less than 10% transmission at 6800 Angstroms.

2. An optical device comprising a light transparent base and a transparent film disposed upon a surface of said base, said film consisting of alternate interference strata of zinc sulfide and a substance having an index of refraction of 1.46 to 1.49, each of said strata of zinc sulfide having an effective optical thickness of about 2500 Angstroms and each of said strata of said substance having an effective optical thickness of about 1250 Angstroms, said film having a short wavelength cutoff characteristic of at least 85% transmission at 4300 Angstroms and less than 10% transmission at 4100 Angstroms and having a long wavelength cutoff characteristic of at least 85% transmission at 6300 Angstroms and less than 10% transmission at 6800 Angstroms.

3. A light filter device comprising a transparent base and a transparent film disposed on a surface of said base, said film consisting of alternate interference strata of zinc sulfide and a substance having an index of refraction of 1.46 to 1.49, each of said zinc sulfide strata having an effective optical thickness of about 2500 Angstroms and each of said strata of said substance having an effective optical thickness of about 1250 Angstroms, said film being transparent to visible light normal to its surface and substantially opaque to invisible light normal to its surface.

4. A light filter transparent to light of substantially all wavelengths in the visible spectrum and substantially opaque to light of wavelengths in the invisible spectrum adjacent to the visible spectrum, said filter comprising a glass base and a film disposed on a surface of said base composed of 6 strata of zinc sulfide, each of one-half wavelength of light at the middle of the visible spectrum in effective optical thickness and 5 strata of thorium-oxy-fluoride, each of one-quarter wavelength of light at the middle of the visible spectrum in effective optical thickness and disposed alternately between said zinc sulfide strata, said filter having a short wavelength cutoff characteristic of at least 85% transmission at 4300 Angstroms and less than 10% transmission at 4100 Angstroms and having a long wavelength cutoff characteristic of at least 85% transmission at 6300 Angstroms and less than 10% transmission at 6800 Angstroms.

5. A photosensitive target for a cathode ray tube comprising a lamina of a photosensitive material supported by a transparent member, a plurality of discrete interference color filters supported by said member, different ones of said filters being transparent to light of different respective colors and each of said color filters being aligned with a different portion of the area of said lamina, and a broad band interference filter supported by said member and extending over substantially the same area of said member as said lamina, said broad band filter comprising alternate strata of zinc sulfide and thorium-oxy-fluoride, said zinc sulfide strata having an effective optical thickness of about 2500 Angstroms and said thorium-oxy-fluoride strata having an effective optical thickness of about 1250 Angstroms, said filter being transparent to light of all wavelengths throughout a wide band of wavelengths in the normal visible spectrum, and having a short wavelength cutoff characteristic of at least 85% transmission at 4300 Angstroms and less than 10% transmission at 4100 Angstroms and having a long wavelength cutoff characteristic of at least 85% transmission at 6300 Angstroms and less than 10% transmission at 6800 Angstroms.

6. A photosensitive target for a cathode ray tube comprising a lamina of a photosensitive material supported by a transparent member, a plurality of discrete interference color filters supported by said member, different ones of said filters being transparent to light of different respective colors and each of said color filters being aligned with a different portion of the area of said lamina, and a broad band interference filter supported by said member and extending over substantially the same area of said member as said lamina, said broad band filter comprising alternate strata of zinc sulfide and a substance having an index of refraction of 1.46 to 1.49, each of said zinc sulfide strata having an effective optical thickness of about 2500 Angstroms and each of said strata of said substance having an effective optical thickness of about 1250 Angstroms, said filter having a short wavelength cutoff characteristic of at least 85% transmission at 4300 Angstroms and less than 10% transmission at 4100 Angstroms and having a long wavelength cutoff characteristic of at least 85% transmission at 6300 Angstroms and less than 10% transmission at 6800 Angstroms.

References Cited in the file of this patent

UNITED STATES PATENTS

| | | |
|---|---|---|
| 2,412,496 | Dimmick | Dec. 10, 1946 |
| 2,446,791 | Schroeder | Aug. 10, 1948 |
| 2,508,267 | Kasperowicz | May 16, 1950 |

FOREIGN PATENTS

| | | |
|---|---|---|
| 1,036,792 | France | Apr. 29, 1953 |
| 1,043,780 | France | June 17, 1953 |

OTHER REFERENCES

"Practical Methods of Making and Using Multilayer Filters," "article by Banning in "The Journal of the Optical Society of America," vol. 37, No. 10, October 1947, pp. 792–797 cited.